(12) United States Patent
Noda et al.

(10) Patent No.: US 6,824,290 B2
(45) Date of Patent: Nov. 30, 2004

(54) ILLUMINATION DEVICE

(75) Inventors: Kazushi Noda, Aichi (JP); Hiroshi Ito, Aichi (JP)

(73) Assignee: Toyoda Gosei Co., Ltd., Nishikasugai-gun (JP)

( * ) Notice: Subject to any disclaimer, the term of this patent is extended or adjusted under 35 U.S.C. 154(b) by 65 days.

(21) Appl. No.: 10/272,021

(22) Filed: Oct. 17, 2002

(65) Prior Publication Data

US 2003/0081411 A1 May 1, 2003

(30) Foreign Application Priority Data

Oct. 18, 2001 (JP) .................................. P2001-320985

(51) Int. Cl.$^7$ .............................................. F21V 33/00
(52) U.S. Cl. ............... 362/155; 362/34; 362/154; 362/321; 362/486; 362/489; 362/800

(58) Field of Search ........................... 362/155, 486, 362/34, 800, 321, 154, 489

(56) References Cited

U.S. PATENT DOCUMENTS 5,008,780 A * 4/1991 Pennington-Ridge ........ 362/34
6,231,219 B1 * 5/2001 Lohss et al. ................ 362/486

FOREIGN PATENT DOCUMENTS

JP          9-272377       10/1997

* cited by examiner

Primary Examiner—John Anthony Ward
Assistant Examiner—James W Cranson
(74) Attorney, Agent, or Firm—McGinn & Gibb, PLLC

(57) ABSTRACT

An illumination device is composed by arranging a shutter member on a light emitting side of an LED light source, capable of changing a condition of light illuminating the outside when a position or the shutter member is changed by slide or rotation.

24 Claims, 6 Drawing Sheets

ILLUMINATION DEVICE

The present application is based on Japanese Patent Application No. 2001-320985, which is incorporated herein by reference.

BACKGROUND OF THE INVENTION

1. Field of the Invention

The present invention relates to an illumination device. The present invention may be preferably applied to illumination of a box-shaped container such a glove box, console box or ash tray arranged in a compartment of an automobile. Further, the present invention may be preferably applied to illumination of a refrigerator entrance door, living room door, shoe box or dressing case having an opening and closing section. Also, the present invention may be preferably applied to illumination of a place having an opening and closing section.

2. Related Art

Visibility of things accommodated in a glove box of an automobile is enhanced by illuminating the inside of the glove box. For example, the following structure is well known. A light source unit, in which a light bulb is installed, is arranged on a side wall of the glove box, and the inside of the glove box is illuminated by light emitted from the light source unit. According to this structure, electric power consumption of the light bulb is large and a large quantity of heat is generated when the light bulb is lit. Further the life of the light bulb is generally short. Therefore, it is not preferable to light the light bulb at all times. For the above reasons, it is common to provide a switching mechanism for controlling a state of turning on and off interlockingly to the light bulb. For example, a switching mechanism is used in which the light bulb is turned on and off interlockingly with the opening and closing motion of the glove box lid. Using the above switching mechanism, when the glove box lid is opened, light emitted from the light source can be illuminated so that the visibility can be enhanced, and when the glove box lid is closed, the light bulb can be turned off. Therefore, inconvenience caused by the above bulb characteristic can be avoided.

However, when the above electric switching mechanism is used, the entire structure becomes complicated undesirably, and further the manufacturing cost is increased because the terminal members used for the switching mechanism are expensive.

On the other hand, there is proposed an illumination device in which LED is used as a light source instead of a light bulb. LED is advantageous in that the electric power consumption is small and the life is long and further the calorific value is low. Therefore, it is possible to light LED at all times. Accordingly, it is possible to omit the above switching mechanism which is necessary when the light bulb is used. Specifically, when LED is arranged at a position so that the inside of the glove box is illuminated by LED and when the LED light source is lit at all times or the LED light source is lit interlockingly with the position lamp, the inside of the glove box can be illuminated when the lid of the glove box is opened, and when the glove box lid is closed, although the LED light source is lit, light emitted from the LED light source can be shielded by the glove box lid. Therefore, even when the switching mechanism is not provided, only when the glove box is opened, the inside of the glove box can be illuminated. The illumination device in which LED is used as a light source can provide the above illumination effect.

However, since it is common that the body and lid of the glove box are manufactured separately from each other and assembled to each other after the completion of the manufacture process, it is difficult to compose the glove box in such a manner that no gap is formed between the glove box body and the lid. It is possible to prevent the formation of the above gap when both are manufactured and assembled with high accuracy. Although the formation of the above gap is prevented in the above way, the manufacturing cost is increased and the manufacturing process becomes complicated. Even if the glove box body and lid are manufactured with high accuracy and no gap is formed between them at the beginning of use, the positional relation between them is delicately changed or they are deformed, so that the formation of a gap is gradually increased, which causes leakage of light emitted from the LED light source. The above leakage of light deteriorates the design of the illumination device. Further, the above leakage of light unnecessarily illuminates the periphery, which is not preferable.

SUMMARY OF THE INVENTION

The present invention has been accomplished to solve the above problems. It is an object to provide an is illumination device or lighting method, the constitution of which is simple, capable of effectively illuminating a box-shaped container such as a glove box.

In order to solve the above problems, the present invention provides an illumination device comprising: an LED light source; and a shutter member arranged on the light emitting side of the LED light source, capable of changing a mode of light illuminating the outside when a position of the shutter member is changed by slide or rotation.

Owing to the above construction, when the shutter member is slid or rotated, it is possible to change a mode of light emitted from the LED light source to the outside. Accordingly, when the device is composed in such a manner that the shutter member is slid or rotated interlockingly with an opening and closing motion of the lid of an accommodating member (for example, a glove box of an automobile), the illuminating mode of light can be changed synchronously with the opening and closing motion of the lid. When the illuminating mode of light is changed in the above way, illumination can be effectively performed. For example, only when the lid is opened, light emitted from the LED light source can be sent outside. That is, the illuminating mode can be changed interlockingly with the opening and closing motion of the lid by a simple mechanism in which the shutter member is slid or rotated. In this way, it is possible to compose an illumination device capable of providing a high illumination effect by a simple structure.

The LED light source is characterized in that the electric power consumption is small, the calorific value is low and the life is long. Therefore, the LED light source is appropriately used for continuously lighting a light over a long period of time. Further, since the size of the LED light source is small, the entire illumination device can be downsized. Therefore, the illumination device can be placed freely. The type of LED is not particularly limited. Various type of LED such as a round type LED, a chip type LED and so forth may be adopted.

The luminescent color of the LED light source is not particularly limited to a specific color. For example, it is possible to adopt an LED light source, the luminescent wave-length of which is in the visible region such as red, orange, green, blue and so forth. It is also possible to adopt an LED light source, the luminescent wave-length of which is in the ultraviolet region. In this case, it is possible to adopt such a composition that fluorescent material is contained in the surface material of an object to be illuminated (inner wall of the glove box), and the fluorescent body emits fluorescent light so as to provide an illumination effect. Further, it is possible to adopt such a composition that fluorescent material is contained in a portion of the shutter member described later and light emitted from LED is illuminated via the portion of the shutter member so as to generate fluorescent light. Furthermore, it is possible to use a photocatalyst. When light is illuminated on the photocatalyst, it is possible to provide a photocatalytic effect such as an antibacterial effect or deodorization effect. For example, a layer containing a photocatalyst is provided on the surface of the shutter member described later, and the layer containing a photocatalyst is illuminated when the shutter member is put into a specific state. Furthermore, an object to which the illumination device of the present invention is attached may contain a photocatalyst so that the object can provide a photocatalytic effect by light emitted outside. Owing to the foregoing, it is possible to build a system capable of providing a photocatalytic effect. In this connection, it is possible to use an LED light emitting source from which light in the visible and ultraviolet region is emitted.

In this connection, the LED light source may be composed of a plurality of LEDs which are combined with each other. In this case, a plurality of LEDs of the same type may be used. Alternatively, LED of different luminescent colors may be combined with each other. When a plurality of LEDs are used, it becomes possible to enhance luminance, and further it becomes possible to conduct illumination by various luminescent colors. In this connection, the number of LED to be used can be determined by a range to be illuminated and luminance to be required.

The shutter member is arranged on the light emitting side of the LED light source and slid or rotated so that the position of the shutter member can be changed. When the position of the shutter member is changed, light emitted from the LED light source is totally shielded, partially shielded, transmitted and color-converted, so that the mode to be illuminated outside can be changed.

As a shutter member, it is possible to adopt one on which an optical window is partially provided. When this shutter member is put into the first state, light of the LED light source is illuminated outside via the window. When this shutter member is put into the second state, light of the LED light source is illuminated on a portion other than the above optical window and the light is shielded. Accordingly, by a simple motion such as a movement of the shutter member, it is possible to make a mode in which light is illuminated outside, and it is also possible to make a mode in which light is not emitted outside. Incidentally, a state of the shutter member means a position or angle of rotation of the shutter member.

Further, when a plurality of windows whose transmittance values with respect to the light emitted from the LED light source are different from each other are arranged, luminance of light illuminating outside can be changed by changing the position of the shutter member. For example, the following constitution can be adopted. There is provided a first window capable of transmitting a portion of light emitted from the LED light source, that is, there is provided a first window, the transmittance of which is not 100% with respect to the light emitted from the LED light source. There is also provided a second window capable of transmitting all light emitted from the LED light source, that is, there is provided a second window, the transmittance of which is 100% with respect to light emitted from the LED light source. When the shutter member is put into the first state, the light is emitted outside via the first window, and when the shutter member is put into the second state, the light is emitted outside via the second window. In this case, the window of predetermined transmittance can be provided in such a manner that, for example, a through-hole is formed on a portion of the shutter member, and the through-hole is covered with a film of predetermined transmittance, or the through-hole is filled with resin of predetermined transmittance. In this connection, the number of windows whose transmittance values are different from each other is not limited to two but the number of windows may be three or more.

It is possible to adopt a shutter member, the color of light illuminating outside of which is changed when the shutter member is moved. For example, an optical window is provided in a portion of the shutter member, and a color-conversion sheet (for example, a film colored by a predetermined color) is set so that the color-conversion sheet can cover the optical window. Alternatively, the window concerned is filled with resin which is colored by a predetermined color. When the device is designed in such a manner that light emitted from the LED light source is illuminated in the through-hole when the shutter member is located at a specific position, light, the color of which is different from the original luminescent color of the LED light source, can be emitted outside. In this connection, it is possible to provide a plurality of optical windows in the shutter member and apply color-conversion sheets of different colors to the respective optical windows.

When a plurality of optical windows, the sizes of which are different from each other, are provided in the shutter member, it is possible to change an illumination range of light illuminated outside via the shutter member. For example, the first window is arranged at a position where light of the LED light source is illuminated when the shutter member is put into the first state, and the second window, which is smaller than the first window, is arranged at a position where light of the LED light source is illuminated when the shutter member is put into the second state. Owing to the above structure, when the slide member is put into the second state, the illumination range of light illuminating outside is reduced as compared with a case in which the slide member is put into the first state. In this connection, when the windows of different sizes are not provided but windows, the sizes of which continuously change stepwise, are provided, the illumination range described above can be also changed as describe above. The illumination device of the present invention can be applied to a box-shaped container having a movable section such as a lid or door. Examples of the box-shaped container are a glove box of an automobile, console box, slide type glove box and ash tray. The illumination device of the present invention can be also applied toan entrance door, living room door, refrigerator, shoe box and dressing case for residence use.

When the illumination device of the present invention is used, it is installed so that the shutter member can be slid or rotated interlockingly with the movable section such as a lid or door of the container which is an object to which the present invention is applied. For example, by using an elastic force of a spring, when the door is opened, the shutter member is fixed at the first position. When the door is closed, the door comes into contact with a portion of the shutter member, and a force in the opposite direction to the elastic force of the spring is acted. Owing to the foregoing, the shutter member is slid or rotated and moved to the second position.

In the case where the present invention is applied to a slide type accommodation member (for example, a slide type glove box of an automobile), the shutter member can be composed so that illuminating modes of multiple stages can be obtained according to the position of the movable section (for example, the slide tray) of the accommodating member. For example, when a shutter member having a plurality of optical windows, the diameters of which are gradually extended from one end to the other end, is adopted, it is possible to provide an illumination device in which luminance of illumination light to illuminate the outside or an illumination range is changed stepwise according to the change in the slide tray.

BRIEF DESCRIPTION OF THE DRAWINGS

FIGS. 4A and 4B are views showing the glove box 50 to which the illumination device 1 is applied, wherein FIG. 4A is a view showing a state in which the lid 52 of the glove box 50 is opened and FIG. 4B is a view showing a state in which the lid 52 of the glove box 50 is closed;

FIGS. 5A and 5B are partially enlarged views of FIGS. 4A and 4B, wherein FIG. 5A is a view in which a portion close to the illumination device 1 in FIG. 4A is enlarged and FIG. 5B is a view in which a portion close to the illumination device 1 in FIG. 4B is enlarged;

DETAILED DESCRIPTION OF THE PREFERRED EMBODIMENTS

Referring to the accompanying drawings, the specific composition of the present invention will be explained as follows.

Figure 1:
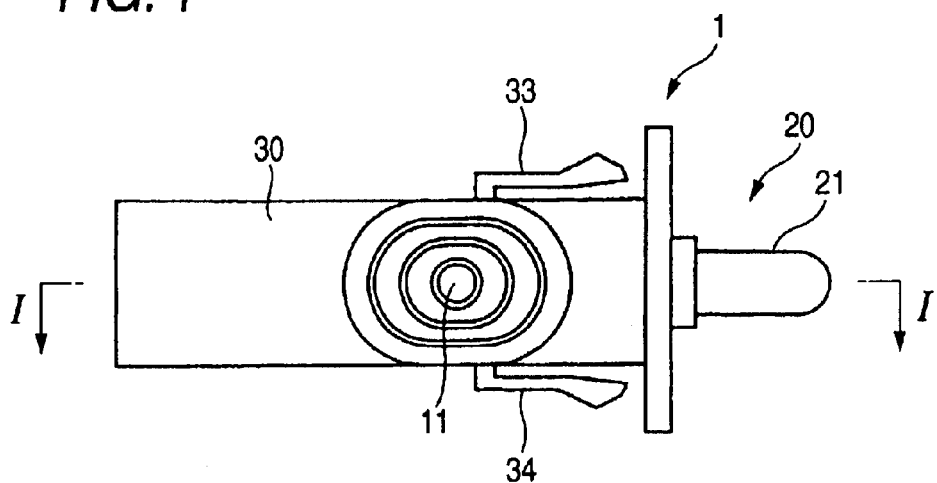
FIG. 1 is a front view of the illumination device 1 of an embodiment of the present invention.
Figure 2:
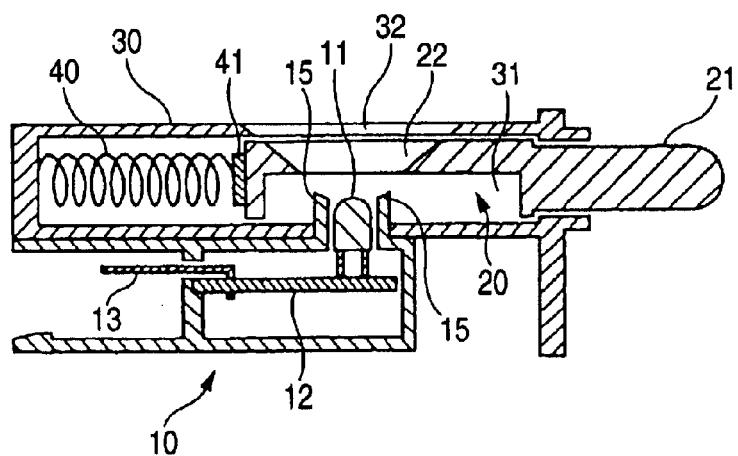
FIG. 2 is a sectional view taken on line I—I in FIG. 1, wherein the inner structure of the illumination device 1 is shown in FIG. 2.

FIG. 1 is a plan view of the illumination device 1 of an embodiment of the present invention. FIG. 2 is a sectional view taken on line I—I in FIG. 1. The illumination device 1 includes a light source unit 10, slide plate 20, which is a shutter member, and casing 30.

The light source unit 10 includes an LED 1 and a base plate 12 on which the LED 11 is mounted. The Led 11 is a round type LED, which emits light, the color of which is umber. Reference numeral 13 is a connecting terminal connected to an electric power source. This connecting terminal 13 is electrically connected with a wiring pattern provided on the base plate 12. The light source unit 10 is attached and fixed to a predetermined position on the casing 30 by utilizing the protrusion 15. In this connection, in this embodiment, the light source unit 10 and the casing 30 are composed separately from each other, however, they may be composed being integrated into one body.

Figure 3:
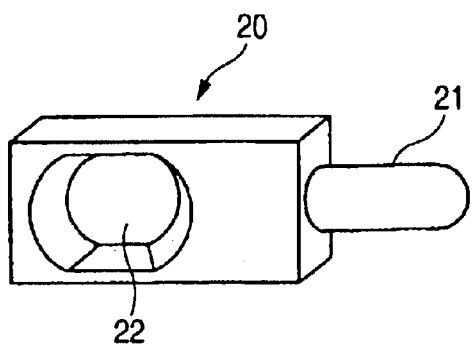
FIG. 3 is a perspective view of the slide plate 20 used for the illumination device 1.

The slide plate 20 is a plate-shaped member through which light is not transmitted. On one end side of the slide plate 20, the protrusion 21 is formed. From the end portion on the opposite side of the protrusion 21 to the center, a substantially elliptical window (through-hole) 22 is formed as shown in FIGS. 2 and 3.

The casing 3 is made of resin through which light is not transmitted in the same manner as the slide plate 20. In the casing 30, there is provided a space 31 in which the slide plate 20 is slidably accommodated. There are provided protrusions 33, 34, at the forward end portions of which pawns are formed, which are used when the illumination device 1 is fixed at an object to be illuminated in the case of using the illumination device 1. Further, in a portion on the upper face of the casing 30, there is provided a substantially elliptical window 32 (through-hole).

The slide plate 20 is accommodated in the space 31 of the casing 30 so that the slide plate 20 can be slid in the traverse direction in the drawing. On the left end side of the space 31 of the casing 30, there is provided a spring 40, one end of which is connected with the slide plate 20 via the connecting piece 41. The other end of the spring 40 is fixed on the inner wall of the casing 30. When the slide plate 20 and the spring 40 are arranged as described above and an elastic force of the spring 40 pushes the slide plate 20 to the right in the drawing, an edge portion on the side of the protrusion 21 of the slide plate 20 is pushed to the inner wall, and the slide plate 20 is fixed at the position shown in FIG. 2. In this case, the positions of LED 11 and windows 22, 32 are designed so that the central axis of the window 22 of the slide plate 20 can agree with the central axis of the window 32 of the casing 30 and also agree with the optical axis of LED 11.

In this case, when the protrusion 21 of the slide plate 20 is pushed to the left in the drawing by a force stronger than the elastic force of the spring 40, the slide plate 20 is slid to the left in the drawing. The slide plate 20 is given an elastic force to the right in the drawing by the spring 40 at all times. Therefore, when a force given to the protrusion 21 to the left in the drawing is released, the slide plate 20 is naturally slid to the right and finally put into the state shown in FIG. 2.

Next, an illuminating mode of the illumination device 1 will be explained in the case where the illumination device 1 is applied to a glove box arranged in the front portion of a navigator's seat of an automobile.

Figure 4A:
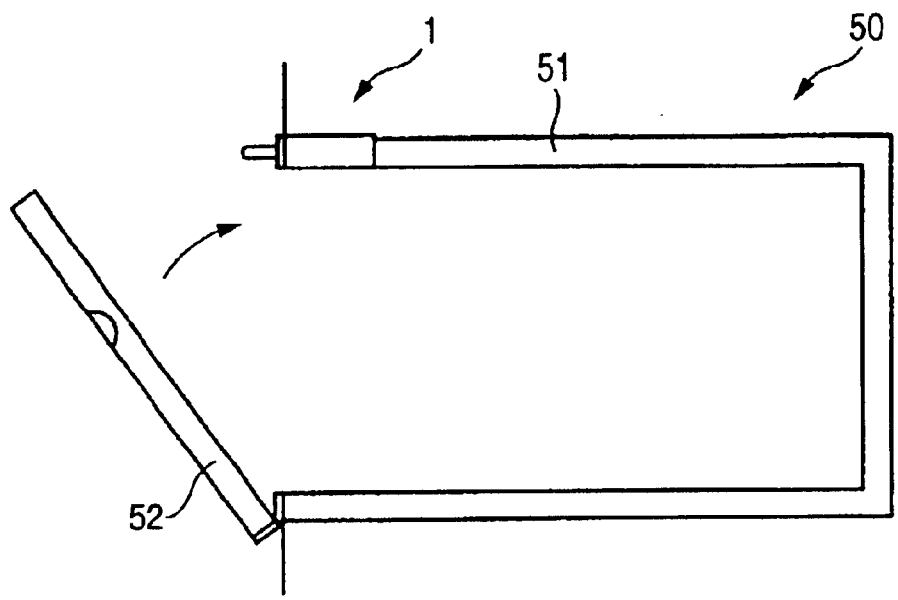
Figure 4B:
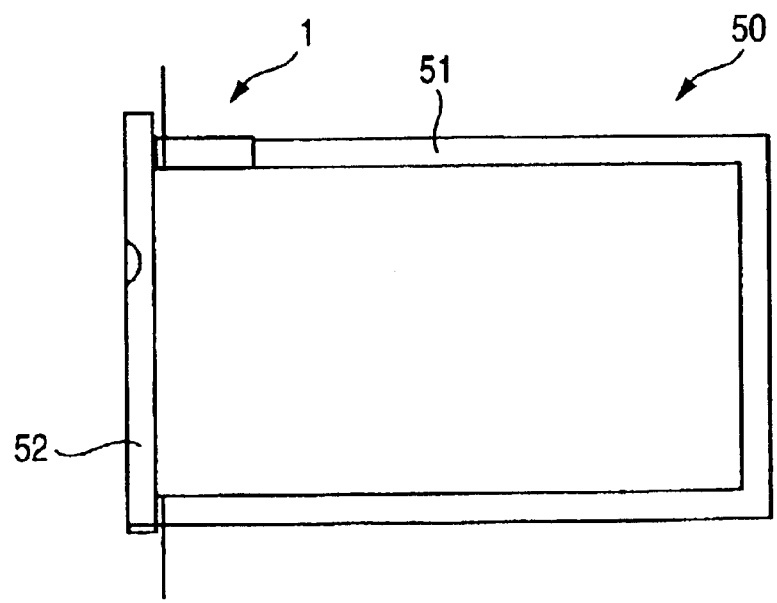

FIGS. 4A and 4B are sectional views showing a state in which the illumination device 1 is arranged in the glove box 50. In this connection, FIG. 4A is a sectional view showing a state in which the lid 52 of the glove box 50 is open, and FIG. 4B is a sectional view showing a state in which the lid 52 of the glove box 50 is closed. As shown in FIGS. 4A and 4B, the illumination device 1 is fixed to an upper wall on the opening section side of the glove box 50.

Figure 5A:
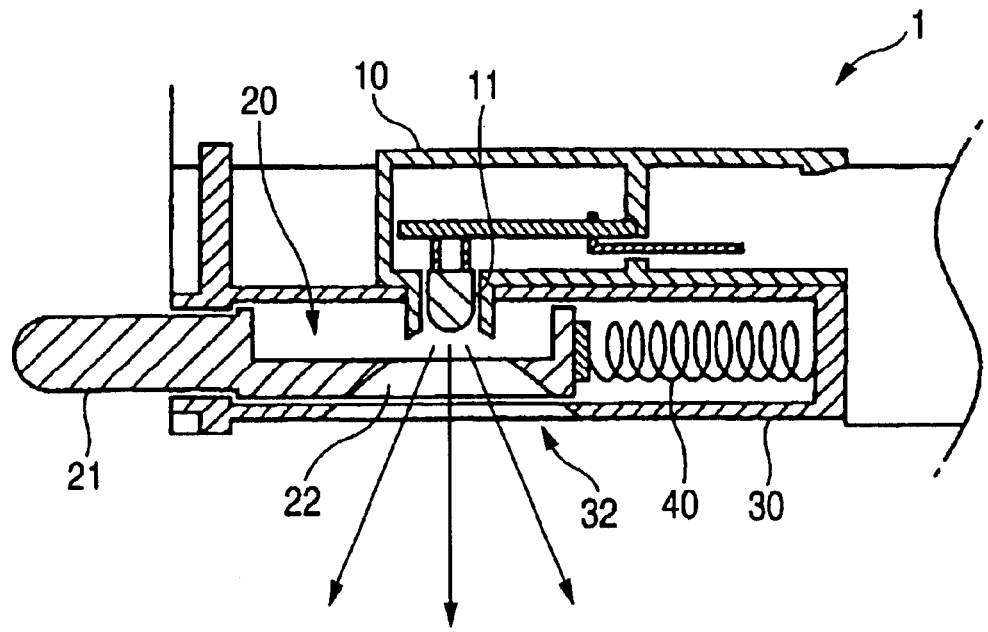
Figure 5B:
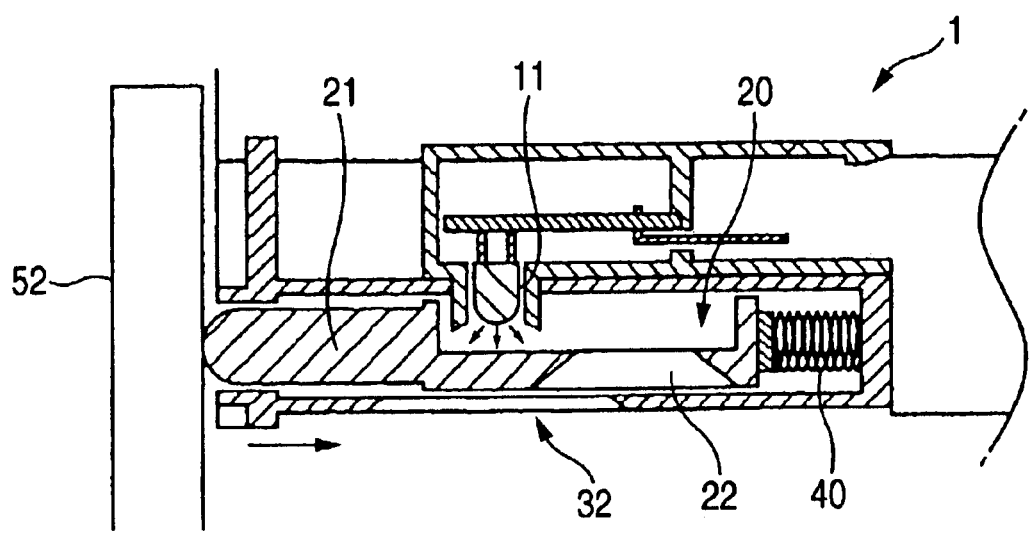

FIGS. 5A and 5B are partially enlarged views showing a portion close to the illumination device 1 in FIGS. 4A and 4B. In this connection, FIG. 5A is a partially enlarged view showing a portion in FIG. 4A, and FIG. 5B is a partially enlarged view showing a portion in FIG. 4B. Referring to FIGS. 4 and 5, one illuminating mode in which the lid 52 of the glove box 50 is open will be explained below, and another illuminating mode in which the lid 52 is closed will be also explained below.

First, synchronously when the position lamp is turned on, electric power is supplied to LED 11. By the foregoing, LED 11 is lit by its luminescent color. While the position lamp is being lit, LED 11 is kept being lit. When the lid of the glove box is opened under the above mode as shown in FIGS. 4A and 5A, the slide plate 20 is pushed and slid to the left in the drawing by an elastic force of the spring 40 and finally stops at the position shown in FIG. 5A. Under the above mode, the optical axis of LED 11, the central axis of the window 22 of the slide plate 20 and the window 32 of the casing 30 agree with each other. Therefore, light emitted from LED 11 passes through the window 22 of the slide plate 20 and next passes through the window 32 of the casing 30 and is emitted outside. Thus the emitted light illuminates the inside of the glove box 50. As a result, the inside of the glove box 50 is illuminated by light, the color of which is amber.

On the other hand, according to the motion of closing the lid 52 of the glove box 50 as shown in FIG. 4B, a face of the lid 52 pushes the protrusion 21 of the slide plate 20 to the right in the drawing. As a result, the slide plate 20 is slid to the right in the drawing in the illumination device 1 as shown in FIG. 5B. When the lid 52 is completely closed, the slide plate 20 is put into the state shown in FIG. 5B. In the above state, the slide plate 20 shields the light emitting side of LED 11. That is, light is shielded by the slide plate 20. Therefore, the inside of the glove box is not illuminated by light emitted from the illumination device 1. Accordingly, no light emitted from LED 11 leaks from a gap between the glove box body 51 and the lid 52.

As described above, an illuminating mode of light emitted from the illumination device 1 is changed interlockingly with the opening and closing motion of the lid 52 of the glove box 50. In the case where the lid 52 is opened so as to enhance the visibility, illumination is effectively conducted by light emitted from LED 11. In the case where the lid 52 is closed, leakage of unnecessary light is prevented, so that deterioration of the design can be prevented.

In the above embodiment, the illumination device 1 is attached to the upper wall of the glove box 50, however, the attaching position of the illumination device 1 is not particularly restricted, and it is possible to attach the illumination device 1 to the side wall or the lid 52 of the glove box 50. It is possible not to directly attach the illumination device 1 to the glove box 50 but to attach the illumination device 1 to a peripheral member such as an attaching frame of the glove box 50.

In the above example, LED 11 is turned on and off synchronously when the position lamp is turned on and off. However, it is possible to control to turn on and off LED 11 synchronously with the start of ignition. Further, it is possible to control to turn on and off LED 11 synchronously when the head light is turned on and off.

Figure 6:
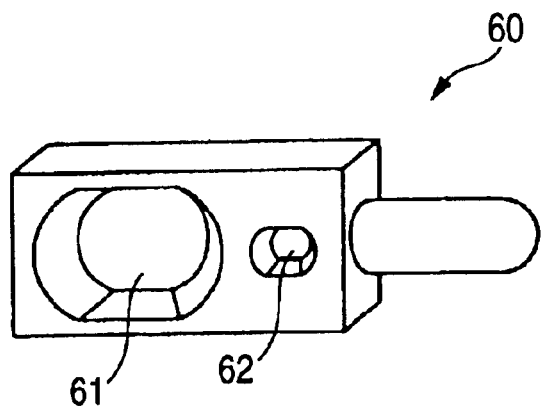
FIG. 6 is a view showing the slide plate 60 of another structure.

In the illumination device 1, by using the slide plate 20 on which the window 22 is formed, it is possible to make a state in which light is illuminated by the illumination device 1 and a state in which light is not illuminated by the illumination device 1. However, when the slide plate 60 shown in FIG. 6 is adopted, it is possible to make a state (state of a large illuminating range) in which light is illuminated through the first window 61 and a state (state of a small illuminating range) in which light is illuminated through the second window 62.

Figure 7:
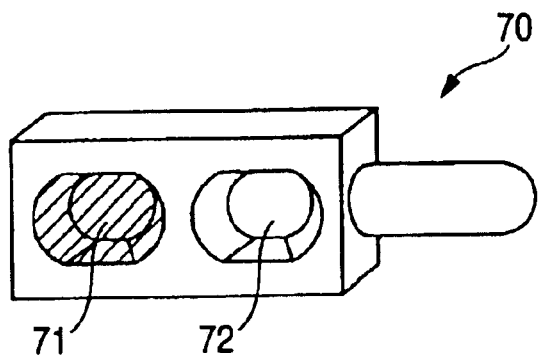
FIG. 7 is a view showing the slide plate 70 of still another structure.

When the slide plate 70 shown in FIG. 7 is adopted, which has two optical windows, one of which is filled with colored resin, it becomes possible to compose an illumination device capable of illuminating light of a different color according to a position of the slide plate 70. Resin of a color different from the color of resin, which is filled in the window 71, may be filled in the window 72. In this connection, instead of filling a colored resin, a color-conversion sheet may be set in the window 71 and/or window 72.

When illumination is conducted by the above illumination device 1, it is possible to provide an effective illumination effect by a simple mechanism, in which the slide plate 20 is moved, without using an electrical switching mechanism. Since the simple mechanism is adopted, the manufacturing cost can be reduced. In addition to that, of course, the stability and reliability of the device can be enhanced.

Figure 8:
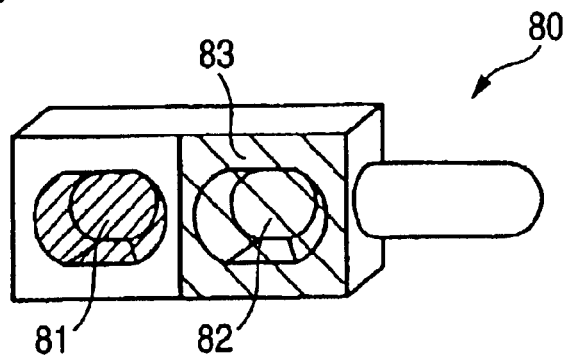
FIG. 8 is a view showing the slide plate 80 used for an illumination device exhibiting an illuminating effect and photocatalytic effect.

Next, explanations will be made into a device (or system) by which the photocatalytic effect can be provided in addition to the illuminating effect. In FIG. 8, there is shown a slide plate 80 composing this device (system). The slide plate 80 is provided with two optical windows 81, 82. Window 81 is filled with resin containing fluorescent material emitting blue fluorescent light when it is exposed to light in the ultraviolet region. On the other hand, a surface of the window 82 is covered with the film 83 containing the photocatalyst ($TiO_3$). In this case, the surface of the window 82 is a surface opposed to the inside (inner wall of the glove box body 51) of the object (glove box 50 in this case) to which the illumination device is attached. In this connection, it is possible to appropriately select the type of the fluorescent body so that a desired illuminating color can be obtained. In this case, a plurality of fluorescent bodies may be combined with each other. Concerning the photocatalyst, a well-known photocatalyst may be appropriately selected and used.

The aforementioned slide plate 80 is incorporated into the casing 30 in the same manner as the above embodiment. As the light source, an LED (for example, an LED made of nitride compound of group III) is adopted. When the composed illumination device is arranged in the glove box 50 in the same manner as the above embodiment, light emitted from the LED is illuminated outside through the window 81 when the lid 52 of the glove box 50 is opened. Accordingly, while light of the LED is passing in the window 81, the fluorescent body is excited by the light, and the inside of the glove box 50 is illuminated by blue fluorescent light generated by the excitation. On the other hand, when the lid 52 of the glove box 50 is closed, the position of the LED and that of the slide plate 80 are relatively changed. Therefore, light emitted from the LED passes in the window 82 and illuminates the photocatalyst contained in the film 83. Owing to the foregoing, the photocatalytic action can be performed, and the antibacterial effect and deodorizing effect can be provided. As described above, when the fluorescent body, photocatalyst and light source emitting light in the ultraviolet region are combined, it is possible to compose an illumination device by which illumination can be effectively conducted and the photocatalytic effect can be provided.

An application of the photocatalyst is not limited to the above specific condition of the use. For example, the photocatalyst may be arranged in a region in which light of glove box 50 is illuminated. Specifically, a photocatalytic layer can be formed on the surface of the inner wall of the glove box body 51.

The device (or system) capable of exhibiting the above photocatalytic effect is preferably applied to an object, of which an antibacterial property and deodorizing property are required, such as an ash tray, shoe box or refrigerator.

In this connection, it is possible to compose a device or system, which is capable of exhibiting an antibacterial effect and deodorizing effect when an opening and closing section such as a door is closed, by combining a photocatalyst with a light source emitting light in the ultraviolet region without using a fluorescent body.

In the above-mentioned embodiments, one of the slide plates 20,60,70,80 as shutter member is provided in the illumination device 1, so that the illuminating mode of the light emitted from the LED 11 is changed by sliding the slide plate interlockingly with the opening and closing of the lid 52. However such the shutter member may be provided on the lid which is rotatably attached to the glove box so as to be opened and closed.

Figure 9:
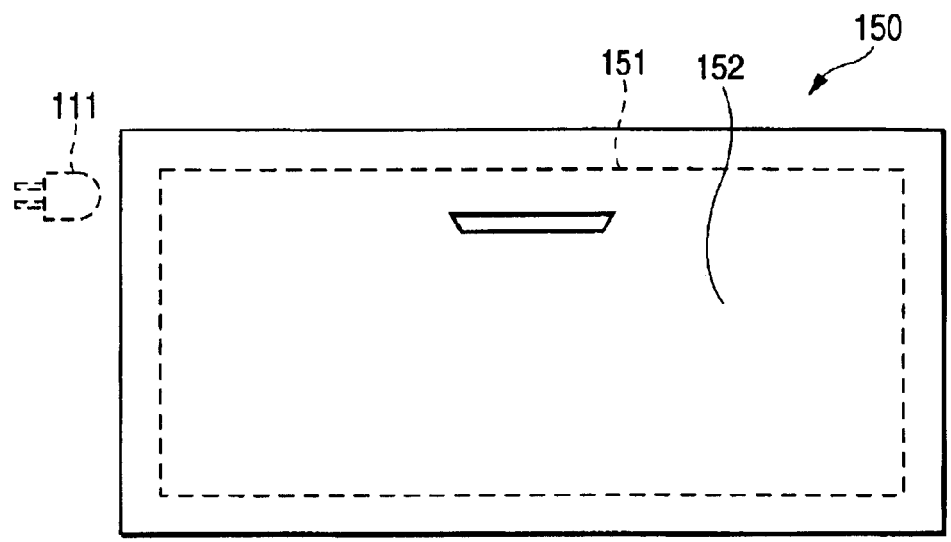
FIG. 9 is a front view of the glove box 150 of another embodiment of the present invention.
Figure 10:
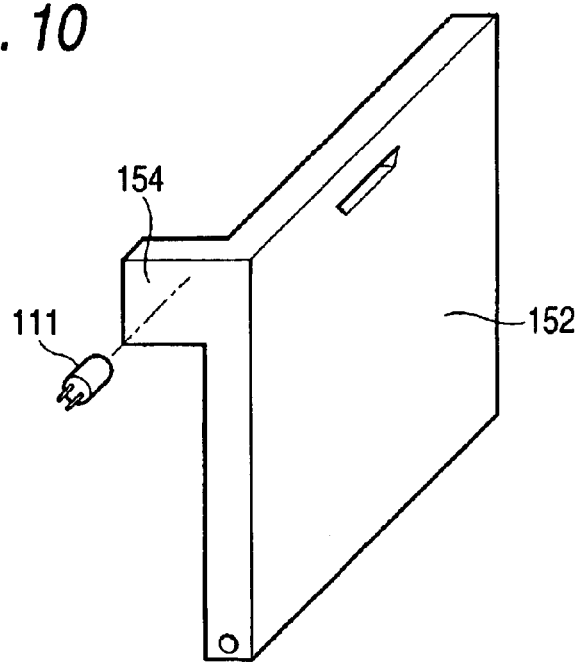
FIG. 10 is a schematic perspective view of the glove box 150 shown in FIG. 9.
Figure 11:
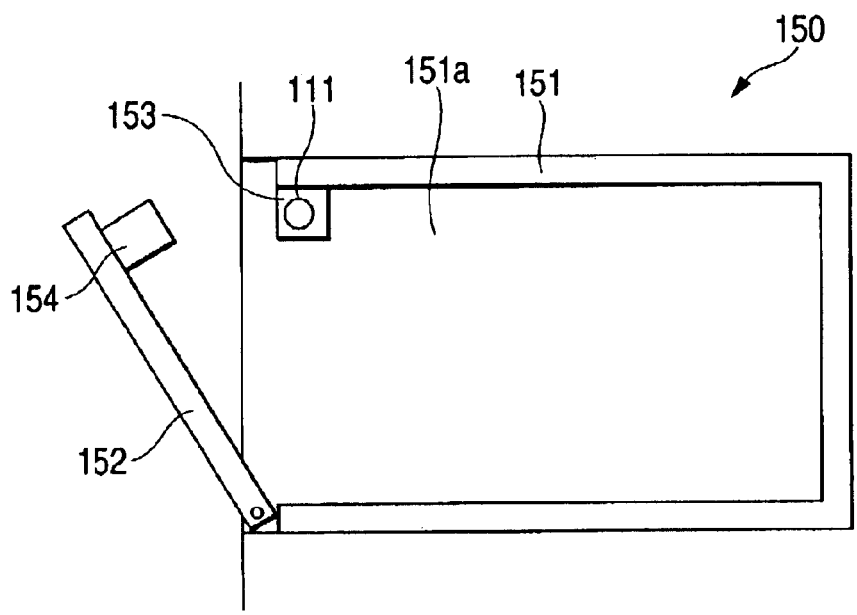
FIG. 11 is a view showing a state in which the lid 152 of the glove box 150 is opened.
Figure 12:
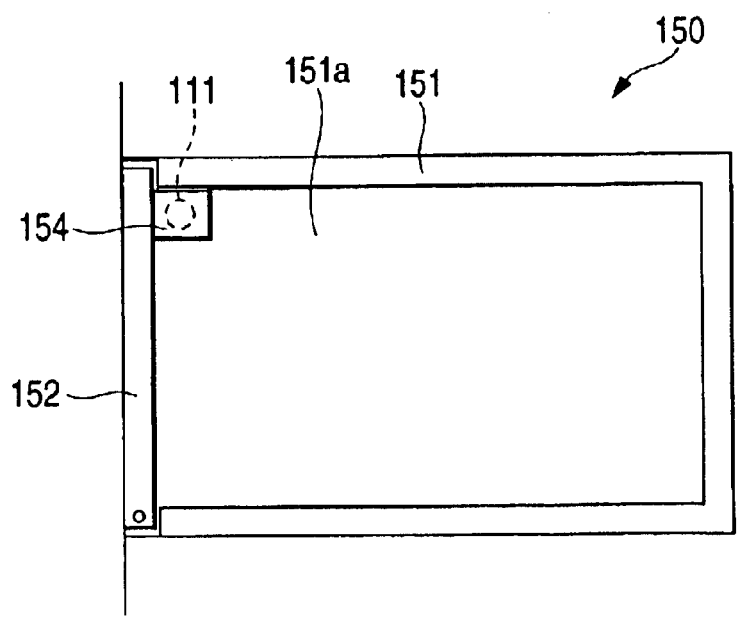
FIG. 12 is a view showing a state in which the lid 152 of the glove box 150 is closed.

FIGS. 9 through 12 show a glove box 150 as the second embodiment. As shown in FIGS. 9 and 10, the glove box 150 is provided with a glove box 151 and a lid 152 attached in the vicinity of an opening of the glove box body 151 so as to be rotatable. Furthermore, an LED 111 which irradiates the inside of the glove box body 151 is positioned on the outside of the glove box body 151. Attachment mode of the LED 111 is not limited specifically. For instance, the LED 111 is accommodated in a housing (not shown) and attached to a side wall 151a of the glove box 151 from the outside thereof. The LED 111 is positioned so as to face a window 153 formed on the side wall 151a through which the light is emitted. As shown in FIG. 10, a shielding rib 154 which serves as a shutter member projects from a side edge of the lid 152 which is located on a side where the LED 111 is provided. In a state that the lid 152 is opened as shown in FIG. 11, the light emitted from the LED 111 irradiates glove box 150 inside through the window 153, and when the lid 152 is closed, the shielding rib 154 covers the window 153 as shown in FIG. 12. In other words, the position of the shielding rib 154 is changed by a rotation of the lid 152 on which the shielding rib 154 is formed. As described above, the leakage of unnecessary light in the state that the lid 152 is closed can be prevented with such the easy structure. The deterioration of the design is prevented.

It should be noted that the present invention is not limited to the explanations of the above embodiment of the present invention. Variations may be made by one skilled in the art without departing from the spirit and scope of the present invention.

What is claimed is:

1. An illumination device comprising:
an LED light source; and
a shutter member at least one of slidably arranged and rotatably arranged on a light emitting side of the LED light source, the shutter member being capable of changing a mode of light irradiated from the illumination device when a state of the shutter member is changed by at least one of sliding and rotating said shutter member,
wherein an illuminating range of the light from the illumination device is changed when a position of the shutter member is changed by at least one of sliding and rotating said shutter member.

2. An illumination device comprising:
an LED light source; and
a shutter member at least one of slidably arranged and rotatably arranged on a light emitting side of the LED light source, the shutter member being capable of changing a mode of light irradiated from the illumination device when a state of the shutter member is changed by at least one of sliding and rotating said shutter member,
wherein a color of the light emitted from the illumination device is changed when a position of the shutter member is changed by at least one of sliding and rotating said shutter member.

3. An illumination device according to claim 1, wherein the LED light source emits light comprising visible light.

4. An illumination device according to claim 1, wherein the LED light source emits light comprising ultraviolet light.

5. An illuminating method of illuminating an inside of a container, comprising:
arranging an LED light source so that the container is illuminated;
arranging a shutter member at least one of slidably and rotatably on a light emitting side of the LED light source; and
changing a mode of light illuminating the container when the shutter member is at least one of slid and rotated interlockingly with an opening and closing motion of the container.

6. An illuminating method according to claim 5, wherein the LED light source comprises a constantly lit LED light source.

7. An illumination device according to claim 2, wherein the LED light source emits light comprising visible light.

8. An illumination device according to claim 2, wherein the LED light source emits light comprising ultraviolet light.

9. An illumination device according to claim 1, wherein the LED light source is illuminated independent of the state of the shutter member.

10. An illumination device according to claim 1, wherein the light emitted from the illumination device illuminates at least a portion of the area.

11. An illumination device according to claim 1, wherein the light emitted from the illumination device illuminates at least a portion of a second area.

12. An illumination device according to claim 1, wherein the area comprises a container.

13. An illumination device according to claim 1, wherein said shutter member comprises a photocatalyst.

14. An illumination device according to claim 1, wherein the shutter member comprises means for performing a photocatalytic action.

15. An illumination device according to claim 14, wherein the photocatalytic action comprises at least one of an antibacterial effect and a deodorizing effect on the area.

16. An illumination device according to claim 1, further comprising means for performing a photocatalytic action.

17. An illumination device according to claim 2, wherein the LED light source is illuminated independent of the state of the shutter member.

18. An illumination device according to claim 2, wherein the light emitted from the illumination device illuminates at least a portion of the area.

19. An illumination device according to claim 2, wherein the light emitted from the illumination device illuminates at least a portion of a second area.

20. An illumination device according to claim 2, wherein the area comprises a container.

21. An illumination device according to claim 2, wherein said shutter member comprises a photocatalyst.

22. An illumination device according to claim 2, wherein the shutter member comprises means for performing a photocatalytic action.

23. An illumination device according to claim 22, wherein the photocatalytic action comprises at least one of an antibacterial effect and a deodorizing effect on the area.

24. An illumination device according to claim 2, further comprising means for performing a photocatalytic action.

* * * * *